(12) United States Patent
Gunn

(10) Patent No.: US 7,307,637 B1
(45) Date of Patent: Dec. 11, 2007

(54) METHOD AND APPARATUS FOR IDENTIFYING PIXEL POSITION AND GEOMETRY IN 3D SYSTEMS

(75) Inventor: Lawrence Arnold Gunn, Santa Clara, CA (US)

(73) Assignee: White Rabbit 3D LLC, Santa Clara, CA (US)

( * ) Notice: Subject to any disclaimer, the term of this patent is extended or adjusted under 35 U.S.C. 154(b) by 0 days.

(21) Appl. No.: 10/952,124

(22) Filed: Sep. 27, 2004

(51) Int. Cl.
*G09G 5/00* (2006.01)
(52) U.S. Cl. .................................................. 345/582
(58) Field of Classification Search ............... None
See application file for complete search history.

(56) References Cited

U.S. PATENT DOCUMENTS 6,157,747 A * 12/2000 Szeliski et al. ............. 382/284
6,362,839 B1 * 3/2002 Hamilton et al. ........... 715/764
6,529,201 B1 * 3/2003 Ault et al. .................. 345/582
6,915,272 B1 * 7/2005 Zilliacus et al. ............. 705/26

OTHER PUBLICATIONS

Watt, "Advanced Animation and Rendering Techniques", 1992, Pearson Education Limited, pp. 179-181.*

* cited by examiner

*Primary Examiner*—Mark Zimmerman
*Assistant Examiner*—Kevin Xu
(74) *Attorney, Agent, or Firm*—Heimlich Law; Alan Heimlich, Esq.

(57) ABSTRACT

A method and apparatus for identifying pixel position and geometry in 3D systems have been disclosed.

9 Claims, 11 Drawing Sheets

METHOD AND APPARATUS FOR IDENTIFYING PIXEL POSITION AND GEOMETRY IN 3D SYSTEMS

FIELD OF THE INVENTION

The present invention pertains to graphics. More particularly, the present invention relates to a method and apparatus for identifying pixel position and geometry in 3D (three dimensional) systems.

BACKGROUND OF THE INVENTION

For presenting information to a human user a graphical presentation is often preferred. Thus, graphical interfaces are used by, for example, computers to present information.

In the field of computer human interface, particularly as it relates to the images on a computer video display and the user's interaction with that display, the display may be two dimensional (2D), or three dimensional (3D), or the display may be in a three dimensional (3D) environment which may be displayed on a two dimensional (2D) screen.

In a 2D user interface positions of interface elements are often defined in terms of pixel positions on a user interface, such as a display monitor. This is a natural way of working with positioning, and may be straight forward if pixels are of uniform size and shape.

In a 3D display system bitmaps may be displayed as texturemaps that are stretched onto polygons in 3D space. If a computer program needs to find the position of a pixel or in some other way act based on the position of a pixel on a texturemap the program may need to know where the texturemap pixel is located. Further, because of effects related to stretching, the texturemap pixel may be stretched or warped. This may present a problem.

BRIEF DESCRIPTION OF THE DRAWINGS

The invention is illustrated by way of example and not limitation in the figures of the accompanying drawings in which.

DETAILED DESCRIPTION

Figure 1:
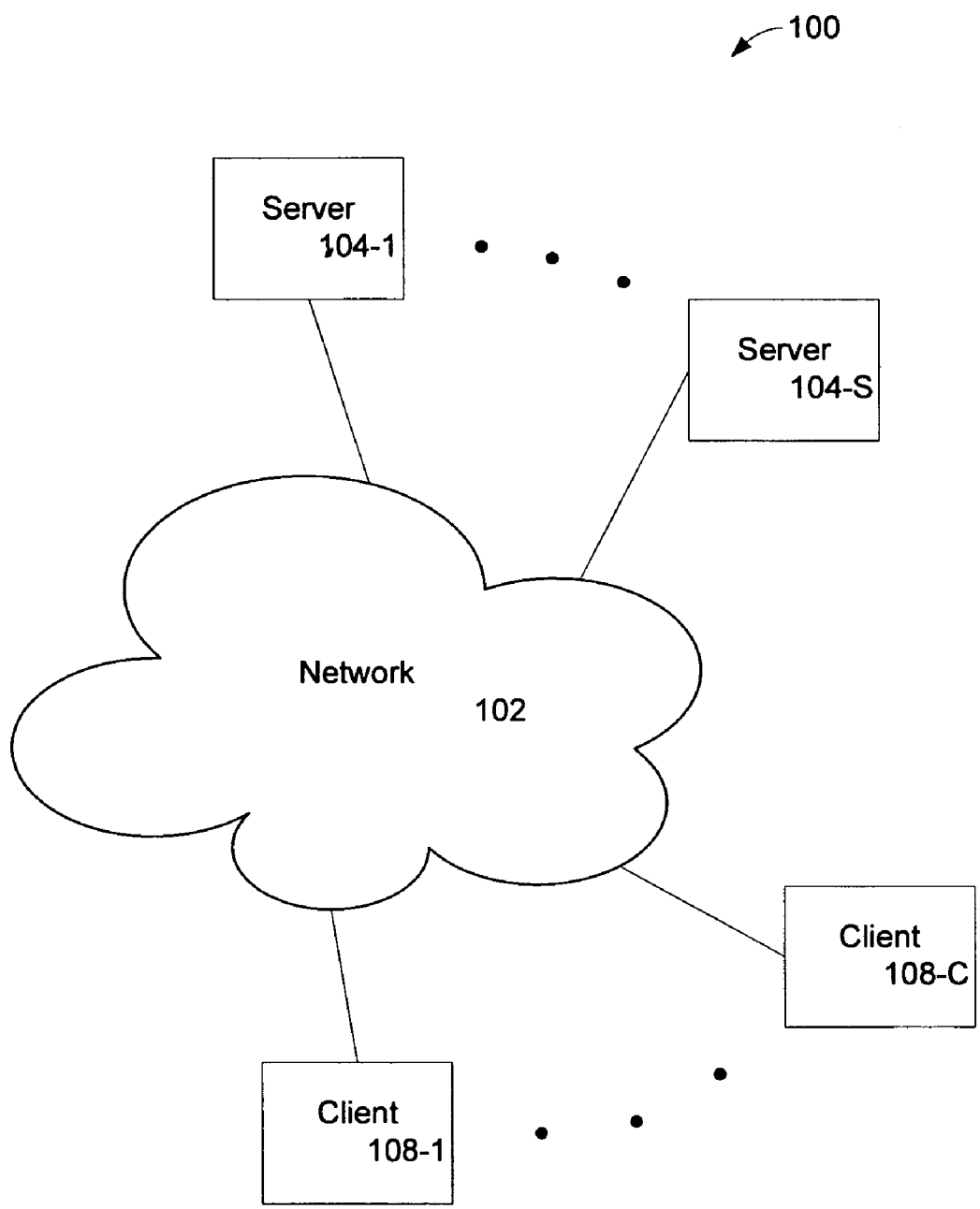
FIG. 1 illustrates a network environment in which the method and apparatus of the invention may be implemented.

The present invention is a method and apparatus for identifying pixel position and geometry in 3D systems. In one embodiment, the invention determines texturemap pixel positions. This information, in another embodiment of the invention, may be used to move 3D objects relative to that position.

The usability and aesthetics of a 3D display or user interface may be enhanced by placing 3D objects on or around each other. In some cases, for example, 3D objects may have bitmaps stretched over the vertices of an object. These bitmaps are often referred to as texturemaps or texture maps. In some instances it may be desirable to place 3D objects in a 3D space on a certain pixel or aligned to a pixel in some way.

An example of this situation may be shown by putting a map of the world "stretched" around a sphere in 3D space. The way this is often done is to have a rectangular map of the world, probably in Mecator projection, made into a texturemap. The texturemap is "stretched" onto the sphere by telling the 3D system which pixel points on the texturemap should be matched up with which vertex points on the sphere. In this process the pixels around the 'equator' of the sphere are roughly rectangular. The ones near the top and bottom of the sphere will be "squashed" widthwise.

Now suppose one wanted to take a 3D object, for example, shaped like a pin and "stick" it in somewhere on this globe to represent a position of interest, say, the capital of the United States. If one knows the size of the original bitmap, how the map of the world was oriented on it, and the position of Washington D.C., one can determine the pixel position of the capital. However, one is now faced with the problem of finding where that pixel is in 3D space, since it is not sufficient simply to know the pixel's position. The pin should be sticking directly out of the surface of the sphere, perpendicular to it (i.e. normal to the surface), therefore the orientation of that particular pixel needs to be known.

In one embodiment of the invention, objects to do this 'pin' type of locating and operation supports the globe example as above, and other types of maps, for example, flat, non-uniform curved, etc. In one embodiment of the invention this information may be obtained from another object.

In one embodiment of the invention, such a system or mechanism supports a query asking for information about a pixel. For example, in one embodiment, the query input is a pixel location, and in response the information returned may be the position in space, the orientation, and other information related to the pixel.

For illustrative purposes one may treat the transfer of information between a position requester object (in the above example it might be the pin or some related object), and a locator or target object (for example, implemented in the sphere above) as being implemented as functions called and/or implemented in hardware and/or software, however, for illustrative purposes the software object model may be a popular implementation, so that will be used for further discussion, however, it is to be understood the invention is not so limited.

Also, the discussion will be in terms of functions (or subroutines) that the objects may have, with normally one piece of information returned by one function. This may be implemented in other ways, for example, in one embodiment with one function returning all the information, or some other reasonable construction. The single function situation is chosen here for ease of explanation. Additionally, it will be appreciated by one skilled in the art that not all parameters may be required, and some parameters may require additional computation which may or may not be used.

In one embodiment of the invention, most of these functions take a pixel position on a texturemap as the input argument. In some cases, such as returning the surfaces model view frame of reference, this may not seem necessary. The input position is likely to be represented as a floating point number. It could be implemented as an integer number, however there are cases where the exact position required may be somewhere on the surface of the pixel and not necessarily on the corner or center of the pixel. This is of importance because a pixel on a texturemap could appear very large on the screen and a small change of position within a pixel could result in a large difference in what the observer of the screen or other viewing device would see.

Note that various embodiments of the invention allow for surface properties that are not fixed and are allowed to be different at various places. For example, one part of a texture map may be displayed as curved, and another part of the texture map on a different set of polygons and in a different frame, may appear as flat.

Figure 3:
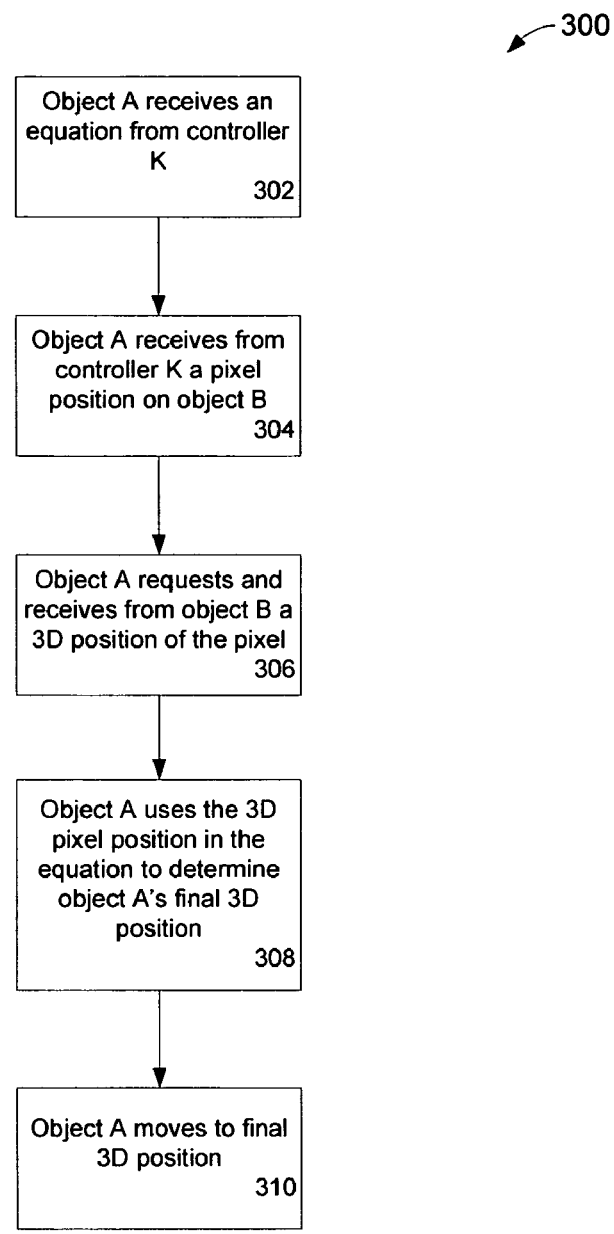
FIG. 3 illustrates one embodiment of the invention showing an object A moving to an object B pixel position.

FIG. 3 illustrates one embodiment of the invention 300 where an object A is moving to an object B pixel position. Another way to view FIG. 3 is that controller K moves (or causes) object A to an object B pixel position. At 302 object A receives an equation from controller K. Controller K may be a process, commands, response to inputs, hardware, software, etc. Controller K as well as object A and object B may all be capable of communicating information back and forth. At 304 object A receives from controller K a pixel position on object B. Object B may or may not be a visible object. At 306 object A requests and receives from object B a 3D position of the pixel on object B. At 308 object A uses the 3D pixel position in the equation (received earlier form controller K at 302) to determine object A's final 3D position. At 310 object A moves to this final 3D position.

Figure 4:
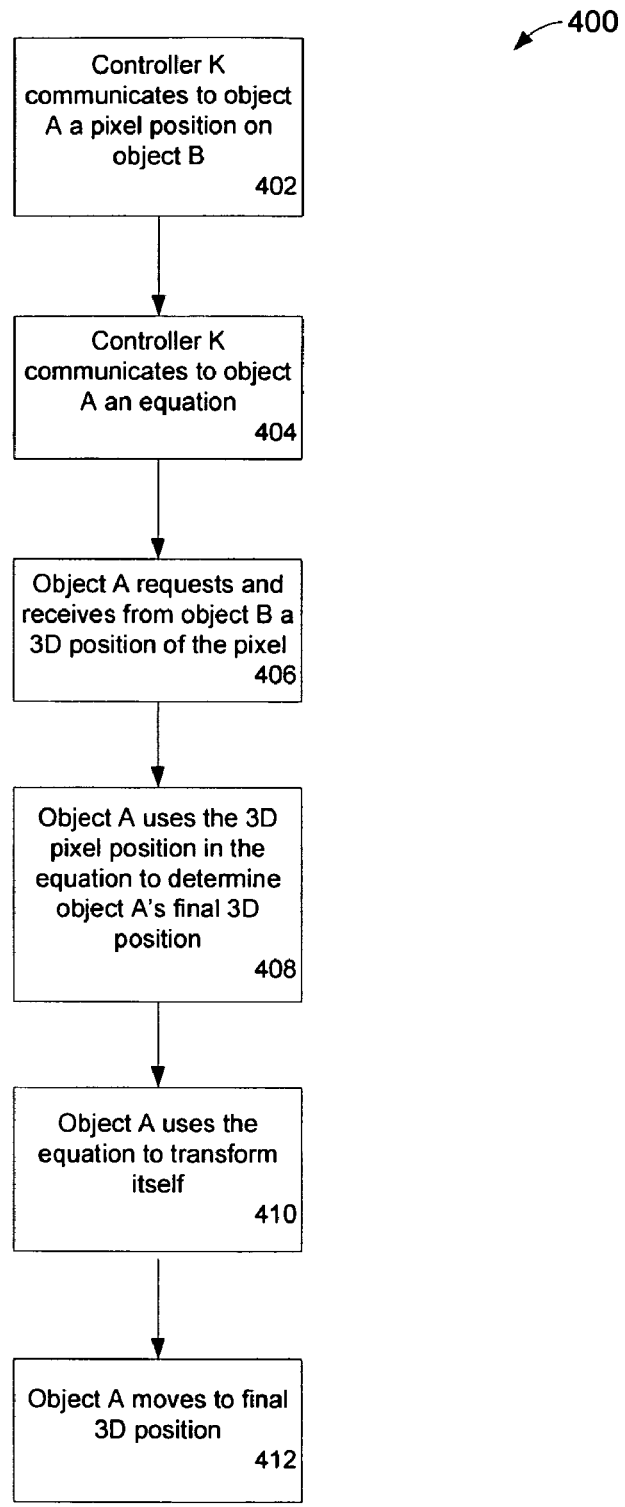
FIG. 4 illustrates one embodiment of the invention where a controller initiates a sequence where an object transforms and moves itself to a position on another object.

FIG. 4 illustrates one embodiment of the invention 400 where controller K initiates a sequence where object A transforms and moves itself to a position on object B. At 402 controller K communicates to object A a pixel position on object B. At 404 controller K communicates to object A an equation. At 406 object A requests and receives from object B a 3D position of the pixel (as communicated to object A by the controller K at 402). At 408 object A uses the 3D pixel position from object B in the equation (provided via controller K communication at 404) to determine object A's final 3D position. At 410 object A uses the equation to transform itself. At 412 object A moves itself to the final 3D position.

The transform at 410 may be, but is not limited to, one or more of the following: sizing, rotation, scaling, etc. Thus for example, before object A places itself at the object B pixel position, it may size itself to one-half its original size. In another example, it may scale by one-half in the x direction and by two times in the y direction. In another example, it may rotate by 37 degrees before moving to the pixel on object B.

One of skill in the art will realize that the exact sequence of sizing and placing may change. That is, the object may place itself and then apply a transform as long as it orients itself to the pixel on object B.

For illustrative purposes the discussion above refers to an equation. In other embodiments of the invention, one or more equations and communications may take place. For the discussion that follows showing examples of positioning a 3D object relative to another using pixel position the following conventions are used:

Controller (K)—The part of the program or hardware giving instructions and information about the positioning of A.

A—The object to be positioned.

B—The object with a grid on the surface. Here grid means a rectangular array, and is usually synonymous with a texture map or bitmap. The way the grid is positioned (or stretched) onto the surface means that the elements in the stretched grid need not have 90 degree corners, parallel sides, or the same length on opposite sides, or even straight sides.

C—An object that knows about the 3D and grid geometry of B. B and C could be the same object.

Pixel coordinates (or grid coordinates)—$x^p$, $y^p$, and $z^p$.

Space coordinates (or 3D space)—$x^s$, $y^s$, and $z^s$.

Screen coordinates (or display coordinates)—$x^n$, $y^n$, and $z^n$.

There exists a function or functions $Q^{p \to s}$ to translate a pixel coordinate to a space coordinate. That is $(x^s, y^s, z^s) = Q^{p \to s}(x^p, y^p, z^p)$.

Figure 5:
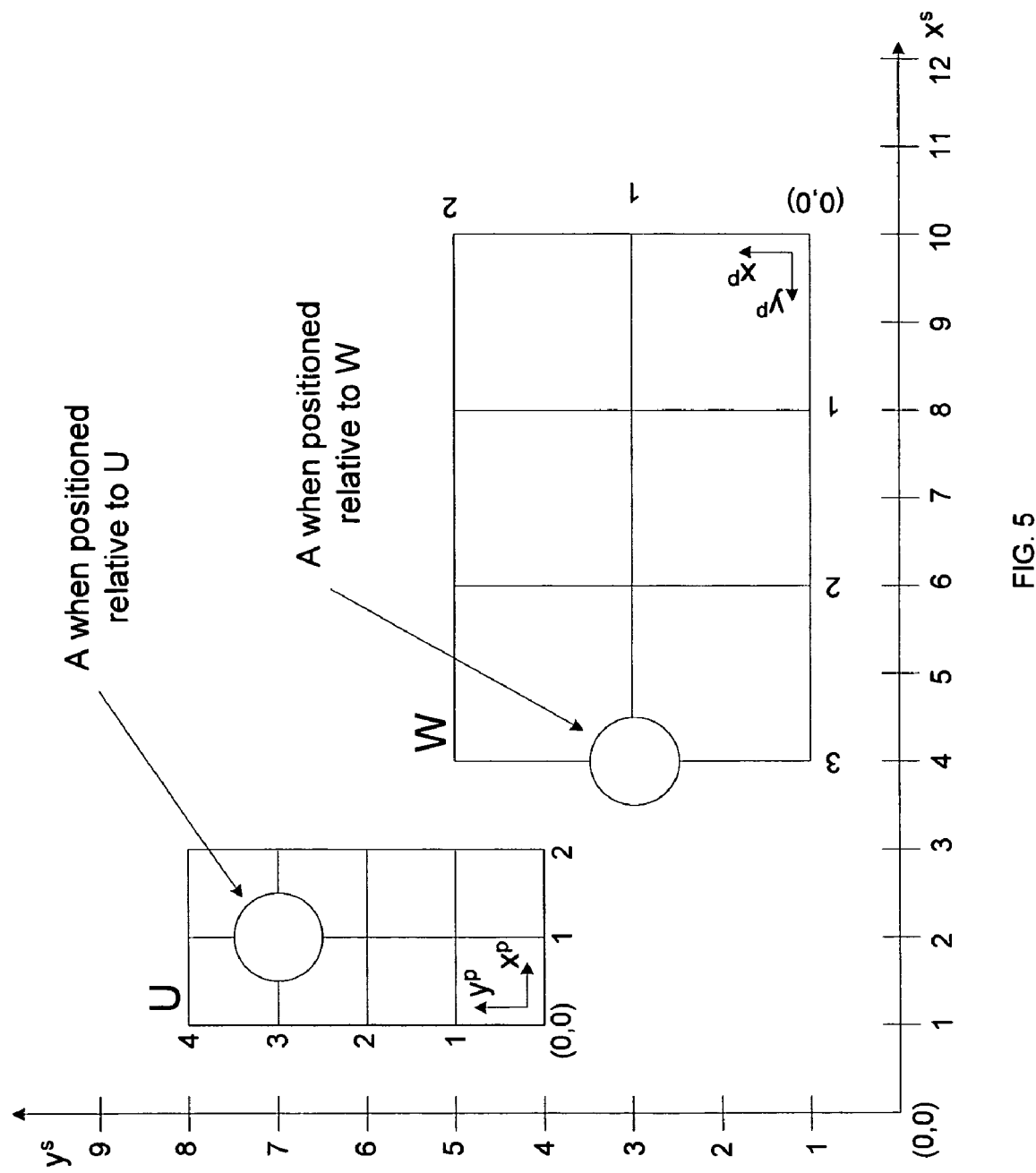
FIG. 5, FIG. 6, FIG. 7, FIG. 8, and FIG. 9 illustrate embodiments of the invention showing examples of object positioning.

FIG. 5 will be used to illustrate one embodiment of the invention showing an example of object positioning. Note that in FIG. 5 that there are several axes. While only x and y axes are illustrated, the z axis is present and set to zero (z=0) for all objects in this example. The first set of axes are the space (denoted by superscript s) axes $x^s$, and $y^s$. In FIG. 5, $x^s$ is labeled from 0 to 12, and $y^s$ is labeled from 0 to 9. The intersection of the $x^s$ and $y^s$ axes is labeled (0,0). Please note that $z^s$ is zero so that we see only the xy plane of the space coordinate. Object U has pixel coordinate axes associated with it denoted as $x^p$ and $y^p$. For object U $x^p$ is labeled 0 to 2, and $y^p$ is labeled 0 to 4. The origin for object U is labeled (0,0). Note that $z^p$ is set to zero in this example. Also note that for object U the $x^p$ axis is parallel to the $x^s$ axis, and that the $y^p$ axis is parallel to the $y^s$ axis. This is for illustration purposes only and is not a limitation of the present invention. Object W has pixel coordinate axes associated with it denoted as $x^p$ and $y^p$. For object W $x^p$ is labeled 0 to 2, and $y^p$ is labeled 0 to 3. The origin for object U is labeled (0,0). Note that $z^p$ is set to zero in this example. Also note that for object W the $x^p$ axis is parallel to the $y^s$ axis, and that the $y^p$ axis is parallel to the $x^s$ axis. This is for illustration purposes only and is not a limitation of the present invention.

Assume a controller (or controlling element) and a 3D (or 2D) object A. The controller wants to position object A. The position is dependent on 3D object B. Object B has a surface and a rectangular grid is stretched over it. Object A is to set its position based on an equation $T_A$ where $T_A$ is dependent on some combination of spatial coordinates and pixel coordinates on object B and how those pixel coordinates translate to spatial coordinates. There is also an object C that is given to object A, where object C knows the translation $Q^{p \to s}$ for object B. Object B and object C could be the same object. For the sake of discussion we will use two different B objects, one will be object U, which we will use first, and the other is object W. We will use the same positioning equation $T_A$ for both.

In this example the following process is used:

1) Start with the pixel coordinates on the B object.
2) Apply them to the equations to produce the point in space of the pixel coordinates.
3) Optionally, apply the position in space to a set of equations to produce another point in space. This is optional because most often the coordinates from 2) are used directly for positioning.
4) Move the object to that position.

Object U is an object of 2 spatial units wide and 4 spatial units high, where the surface coordinate system of U is aligned with the spatial coordinate system, namely, its x direction ($x^p$) points in the same direction as the spatial systems x coordinate ($x^s$), and the same can be said for the y surface and spatial axes.

For this example we will use the positioning equations as $$x^s_A = x^s_B \quad (1)$$

$$y^s_A = y^s_B \quad (2)$$

$$z^s_A = z^s_B \quad (3)$$

Eq. 1 where $$x^s_B = Q_x^{p \to s}(x^p_B) \text{ where } x^p B = 1 \quad (1)$$

$$y^s_B = Q_y^{p \to s}(y^p_B) \text{ where } y^p B = 3 \quad (2)$$

$$z^s_B = Q_z^{p \to s}(z^p_B) \text{ where } z^p B = 0 \quad (3)$$

Eq. 2

For object U the translation equations $Q_U^{p \to s}$ are $$x^s_B = 1 + x^p_B \quad (1)$$

$$y^s_B = 4 + y^p_B \quad (2)$$

$$z^s_B = 0 + z^p_B \quad (3)$$

Eq. 3

Equation 1, line 1, $x^s_A = x^s_B$ denotes that the x space coordinate of object A is equal to the x space coordinate of object B. Equation 1, line 2 and line 3 denote that the y and z space coordinates of object A are equal to the y and z space coordinates of object B respectively. Note that a later example will show where these need not be equal.

Equation 2, line 1, $x^s_B = Q_x^{p \to s}(x^p_B)$ where $x^p_B = 1$, denotes that the x space coordinate of object B is equal to the conversion (via function $Q_x^{p \to s}$) of x pixel coordinate of object B ($x^p_B$) into the x space coordinate of object B. Here that conversion (via function $Q_x^p$'s) will use an x pixel coordinate for object B ($x^p_B$) value of 1. Equation 2, line 2, $y^s_B = Q_y^{p \to s}(y^p_B)$ where $y^p_B = 3$, denotes that the y space coordinate of object B is equal to the conversion (via function $Q_y^{p \to s}$) of y pixel coordinate of object B ($y^p_B$) into the y space coordinate of object B. Here that conversion (via function $Q_y^{p \to s}$) will use a y pixel coordinate for object B ($y^p_B$) value of 3. Equation 2, line 3, $z^s_B = Q_z^{p \to s}(z^p_B)$ where $z^p_B = 0$, denotes that the z space coordinate of object B is equal to the conversion (via function $Q_z^p$'s) of z pixel coordinate of object B ($z^p_B$) into the z space coordinate of object B. Here that conversion (via function $Q_z^{p \to s}$) will use a z pixel coordinate for object B ($z^p_B$) value of 0.

Please note that the conversion for x, y, and z (as denoted by $Q_x^{p \to s}$, $Q_y^{p \to s}$, and $Q_z^{p \to s}$) are independent functions that may be anything. For example, the conversion of x in most cases will probably be related to the x coordinates; however this is not a limitation of the present invention. For example, the conversion of x may be related to y coordinates, z coordinates, time, etc., or any combination of factors.

Equation 3 deals with the pixel to space coordinate conversions for object U. This is denoted as $Q_U^{p \to s}$. Here, assume that the object B is the object U so the equations refer to object B space (s) and object B pixel (p) coordinates (referring to object U). Equation 3, line 1, $x^s_B = 1 + x^p_B$, denotes that the x space coordinate of object B (object U) is equal to the x pixel coordinate of object U plus 1. So, for example, the object U x=0 pixel coordinate (i.e. $x^p_B = 0$) is equal to the x=1 space coordinate. This may be readily seen in FIG. 5. Equation 3, line 2, $y^s_B = 4 + y^p_B$, denotes that the y space coordinate of object B (object U) is equal to the y pixel coordinate of object U plus 4. So, for example, the object U y=0 pixel coordinate (i.e. $y^p_B = 0$) is equal to the y=4 space coordinate. This may be readily seen in FIG. 5. Equation 3, line 3, $z^s_B = 0 + z^p_B$, denotes that the z space coordinate of object B (object U) is equal to the z pixel coordinate of object U plus 0. So, for example, the object U z=0 pixel coordinate (i.e. $z^p_B = 0$) is equal to the z=0 space coordinate. Thus the object U (0,0) pixel coordinate is located at the (1,4) space (also called spatial) coordinate. Note that the increments in the pixel dimensions for object U ($x^p$ and $y^p$) just happen to be the same size increments as the space increments ($x^s$ and $y^s$); this is for illustration purposes and is not a limitation of the invention.

Equations 3 may also be described as follows. For the x, the spatial (space) coordinate is the offset of the origin of U in the $x^s$ direction, which is 1 spatial unit, and the number of pixels across, the pixel size of one pixel happens to be equal to one spatial unit. For the y, the spatial coordinate is the offset of the origin, 4, and the pixel size in spatial units, again 1. The z spatial is 0 offset and we will treat the spatial size of a pixel in the z direction equal to one spatial unit.

From this we substitute the ($x^p_B$, $y^p_B$, $z^p_B$,) coordinates of (1, 3, 0) into Equation 3 (shown) to get $$x^s_B = 1 + x^p_B = 1 + 1 = 2 \quad (1)$$

$$y^s_B = 4 + y^p_B = 4 + 3 = 7 \quad (2)$$

$$z^s_B = 0 + z^p_B = 0 + 0 = 0 \quad (3)$$

Eq. 4

So the insertion point of object A to be positioned with respect to object B (object U) would be at spatial (space) coordinate ($x^s_A$, $y^s_A$, $z^s_A$,) which from Equation 1 yields (2,7,0) since $x^s_A = x^s_B = 2$, $y^s_A = y^s_B = 7$, and $z^s_A = z^s_B = 0$. Assume that object A is a circle of radius 0.5 spatial units and that the insertion point of object A is the center of the circle. This positioning is shown in FIG. 5 at "A when positioned relative to U" where the center of object A is at space coordinates (2,7,0).

Now consider a second example similar to the previous one, except that instead of object A being given object U as the B object it is given object W by the controller. Note that the C object now returns information about W. We will keep the same Equations 1 in this example, that is: $x^s_A = x^s_B$, $y^s_A = y^s_B$, and $z^s_A = z^s_B$.

The translation equations for W, $Q_w^{p \to s}$ differ from those of U for two reasons. First, the coordinate system on the surface of W is rotated 90 degrees from that of the spatial coordinate system. So, the x axis of W is in the same direction as the y axis of the spatial coordinate system, and the y axis of W is in the same direction as the negative x spatial axis. The second difference is that 1 pixel unit of size on the surface of W is 2 units distance on the spatial coordinate system. So, the equations are $$x^s_B = 10 - 2y^p_B \quad (1)$$

$$y^s_B = 1 + 2x^p_B \quad (2)$$

$$z^s_B = 0 + z^p_B \quad (3)$$

Eq. 5

Equation 5 deals with the pixel to space coordinate conversions for object w. This is denoted as $Q_w^{p \to s}$. Here, as stated before assume that object A has been give object W as the B object. Equation 5, line 1, $x^s_B = 10 - 2y^p_B$, denotes that the x space coordinate of object B (object W) is equal to 10 minus 2 times the y pixel coordinate of object W. So, for example, the object W y=0 pixel coordinate (i.e. $y^p_B=0$) corresponds to the x=10 space coordinate. This may be readily seen in FIG. 5 on object W. Equation 5, line 2, $y^s_B = 1 + 2x^p_B$, denotes that the y space coordinate of object B (object W) is equal to 2 times the x pixel coordinate of object B plus 1. So, for example, the object B x=0 pixel coordinate (i.e. $x^p_B=0$) is equal to the y=1 space coordinate. This may be readily seen in FIG. 5. Equation 3, line 3, $z^s_B = 0 + z^p_B$, denotes that the z space coordinate of object B (object W) is equal to the z pixel coordinate of object W plus 0. So, for example, the object W z=0 pixel coordinate (i.e. $z^p_B=0$) is equal to the z=0 space coordinate. Thus the object W (0,0) pixel coordinate is located at the (10,1) spatial coordinate. Note that the increments in the pixel dimensions for object W ($x^p$ and $y^p$) just happen to be the same size. This need not be the case and the "grid" may be other shapes, such as, trapezoidal, an irregular shape, a rectangle stretched in one direction, etc.

For the ($x^p_B$, $y^p_B$, $z^p_B$,) coordinates of (1, 3, 0) we get:

$$x^s_B = 10 - 2y^p_B = 10 - 2*3 = 4 \quad (1)$$

$$y^s_B = 0 + 2x^p_B = 1 + 2*1 = 3 \quad (2)$$

$$z^s_B = 0 + z^p_B = 0 + 0 = 0 \quad (3)$$

Eq. 6

So the insertion point of object A (the center of a circle of radius of 0.5 spatial units) would be at spatial coordinate ($x^s_A$, $y^s_A$, $z^s_A$,)=(4,3,0) (via Equation 1). This is shown in FIG. 5 at "A when positioned relative to W."

One of skill in the art will appreciate that given the same input to A from the controller, with the only difference being the surface object, the final position can be different.

Figure 6:
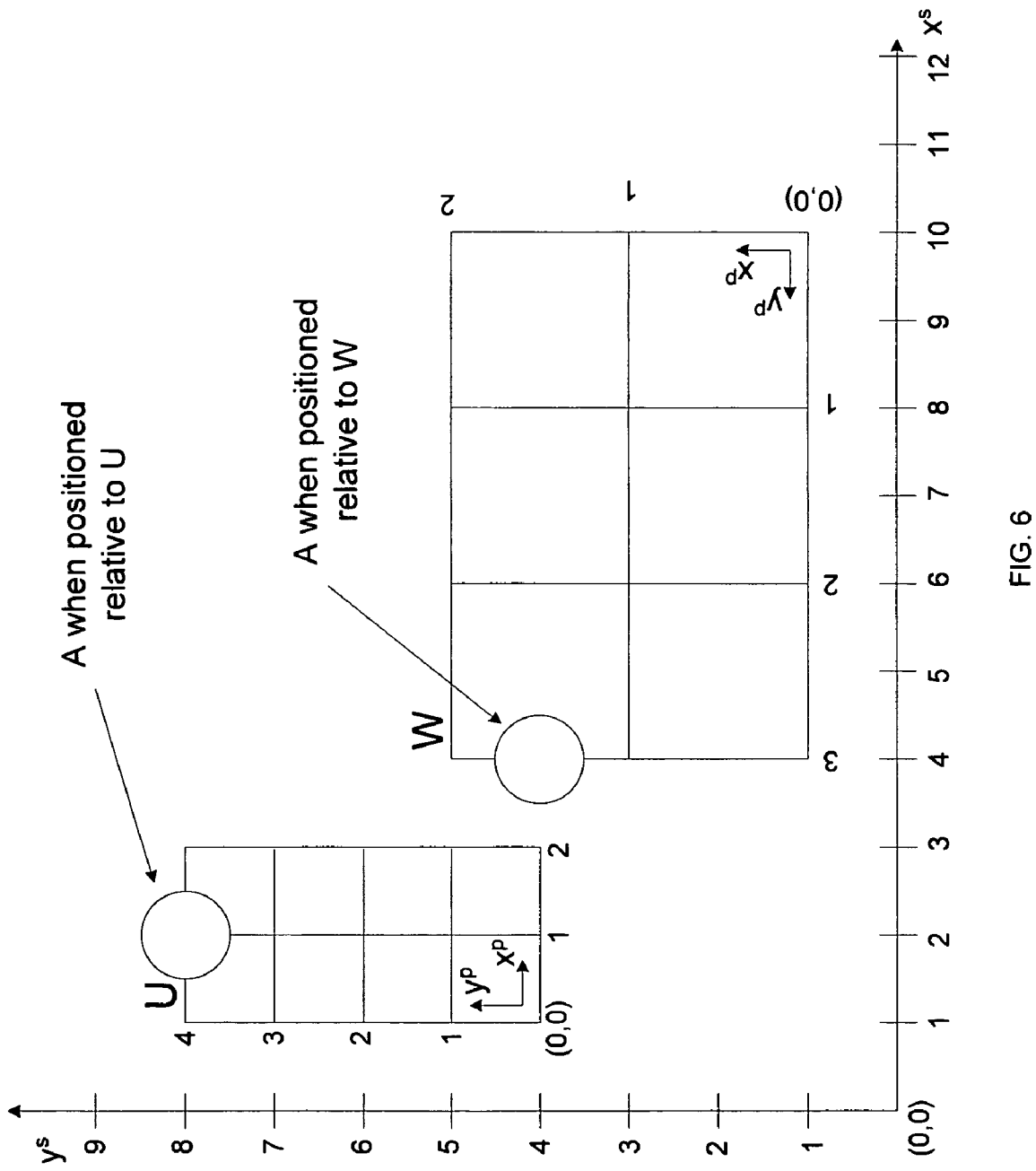

In the next example of an embodiment of the invention as illustrated in FIG. 6. The positioning equation is $$x^s_A = x^s_B \quad (1)$$

$$y^s_A = y^s_B + 1 \quad (2)$$

$$z^s_A = z^s_B \quad (3)$$

Eq. 7

This is similar to Equation 1 except there is an offset of +1 in object A's y position. Using the same Equation 2 and Equation 3 above as well as the object B being object U, and $x^p_B=1$, $y^p_B=3$, and $z^p_B=0$, we get as before:

$$x^s_B = 1 + x^p_B = 1 + 1 = 2 \quad (1)$$

$$y^s_B = 4 + y^p_B = 4 + 3 = 7 \quad (2)$$

$$z^s_B = 0 + z^p_B = 0 + 0 = 0 \quad (3)$$

Eq. 8

Now, substituting these values into Equation 7, we now get ($x^s_A$, $y^s_A$, $z^s_A$,)=(2,8,0) as is shown in FIG. 6 at "A when positioned relative to U."

Continuing the example for object B now being object W, and using Equation 7 for positioning, Equation 5 for the object W translation, and $x^p_B=1$, $y^p_B=3$, and $z^p_B=0$, we now get as before:

$$x^s_B = 10 - 2y^p_B = 10 - 2*3 = 4 \quad (1)$$

$$y^s_B = 1 + 2x^p_B = 1 + 2*1 = 3 \quad (2)$$

$$z^s_B = 0 + z^p_B = 0 + 0 = 0 \quad (3)$$

Eq. 9

However, now substituting into the positioning Equation 7 we get:

$$x^s_A = x^s_B = 4 \quad (1)$$

$$y^s_A = y^s_B + 1 = 3 + 1 = 4 \quad (2)$$

$$z^s_A = z^s_B = 0 \quad (3)$$

Eq. 10

This is shown in FIG. 6 at "A when positioned relative to W."

These examples illustrate how object A's position is based on an equation $T_A$ where $T_A$ is dependent on some combination of spatial coordinates and pixel coordinates on object B and how those pixel coordinates translate to spatial coordinates.

Figure 7:
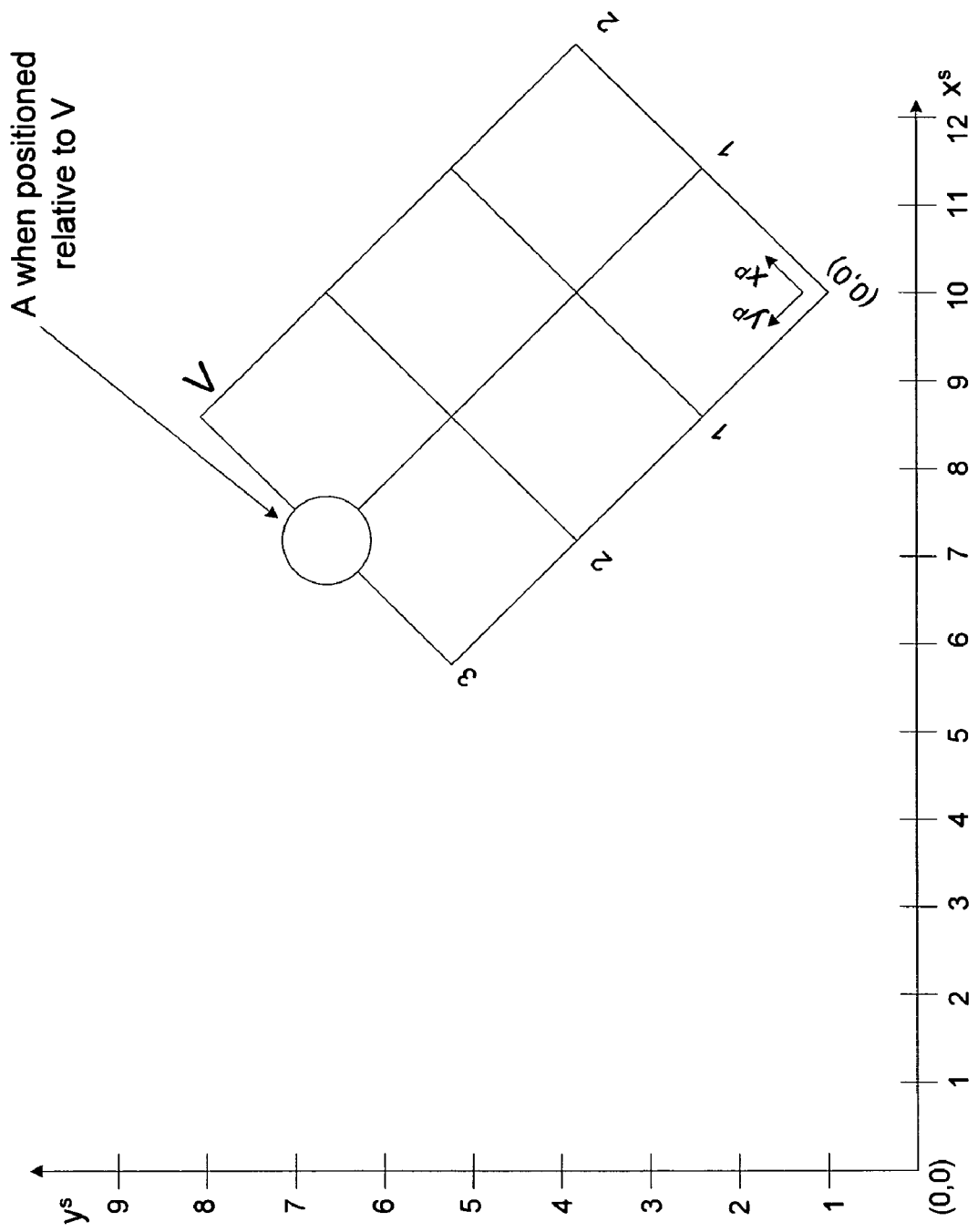

The next example of an embodiment of the invention deals with object positioning with the $x^p$ and $y^p$ axes of the surface not parallel to either axis of the coordinate system that it is in as is shown in FIG. 7. For sake of illustration we have kept the grid on object V square. This is not a limitation of the invention.

This time we will work with an object V, which is the same size and shape as W (from FIG. 5 and FIG. 6), however it is tilted at 45 degrees from the spatial coordinate axes.

The translation equation for V pixel to spatial coordinates is:

$$x^s_B = 10 + 2(0.7071 x^p_B) - 2(0.7071 y^p_B) \quad (1)$$

$$y^s_B = 1 + 2(0.7071 x^p_B) + 2(0.7071 y^p_B) \quad (2)$$

$$z^s_B = 0 + z^p_B (3)$$

Eq. 11

We will use the coordinates directly for positioning, so the equation for $T_A$ is:

$$x^s_A = x^s_B \quad (1)$$

$$y^s_A = y^s_B \quad (2)$$

$$z^s_A = z^s_B \quad (3)$$

Eq. 12

For the $(x^p{}_B, y^p{}_B, z^p{}_B,)$ coordinates of $(1, 3, 0)$ we get from Equation 11

$$x^s{}_B = 10 + 2(0.7071 x^p{}_B) - 2(0.7071 y^p{}_B) = 10 + 2(0.707*1) - 2(0.707*3) = 7.1716 \quad (1)$$

$$y^s{}_B = 1 + 2(0.7071 x^p{}_B) + 2(0.7071 y^p{}_B) = 1 + 2(0.707*1) + 2(0.707*3) = 6.6568 \quad (2)$$

$$z^s{}_B = 0 + z^p{}_B = 0 + 0 = 0 \quad (3)$$

Eq. 13

So the insertion point of object A would be at spatial coordinate $(x^s{}_A, y^s{}_A, z^s{}_A,) = (7.1716, 6.6568, 0)$.

The examples of embodiments of the present invention so far have had an A and B objects existing in the $x^s y^s$ plane where the $z^s$ value was always zero. This represents a 2 dimensional (2D) example. The present invention is not so limited, and in this example of one embodiment of the present invention we extend this to a 3D example.

Figure 8:
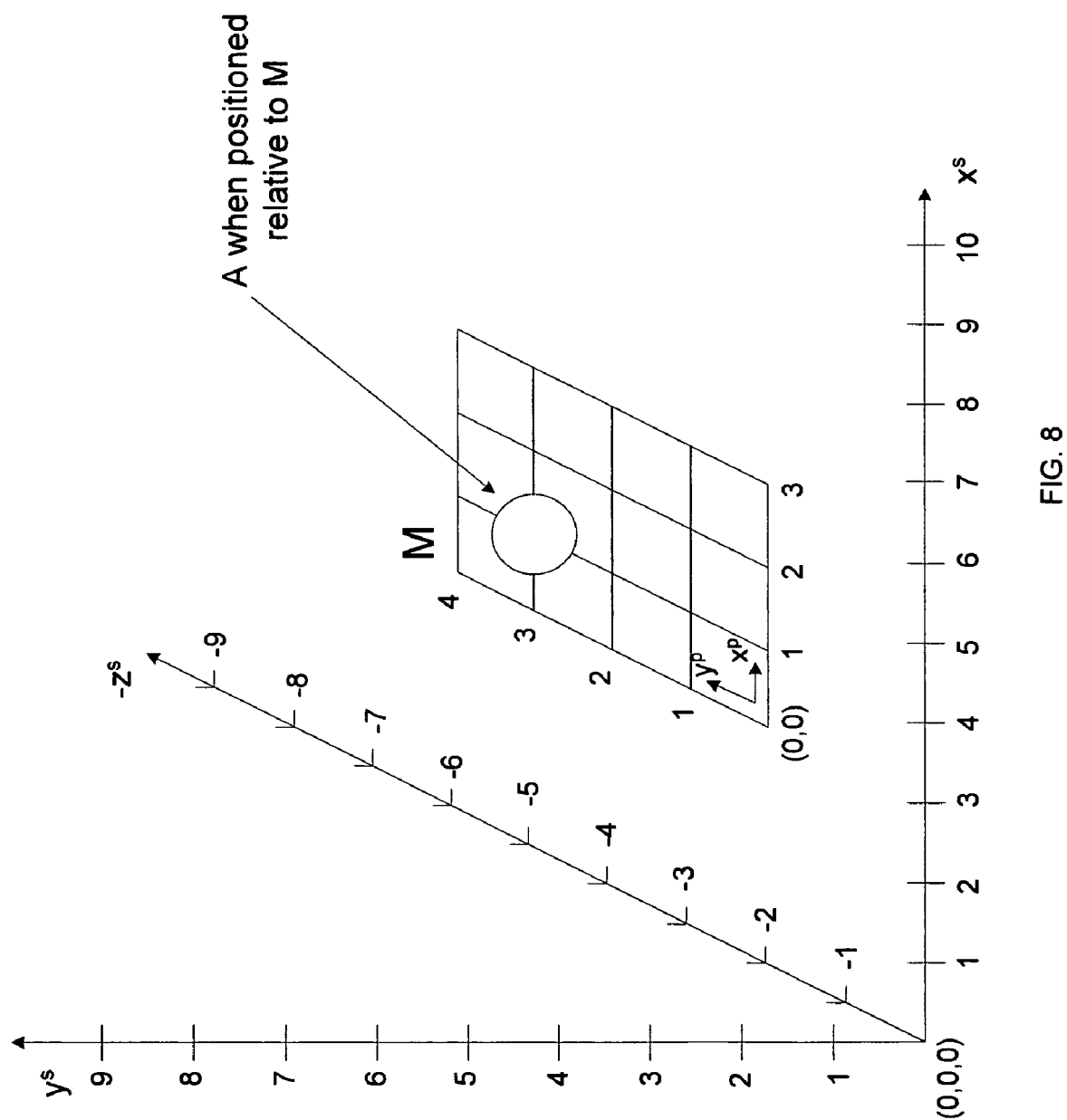

FIG. 8 illustrates a 3D example of one embodiment of the present invention. Consider a surface M which has a pixel grid of 3 pixel units by 4 pixel units. The x pixel axis is pointing in the x spatial direction, the y pixel axis is pointing along the z spatial direction, and the plane of M is at a uniform 0 y spatial unit above the $x^s z^s$ plane. Note that in other embodiments of the present invention, it is very possible that surfaces may have a pixel axis pointing in a direction such that some it has some components of all three spatial axes, that is, in any orientation, however this would make the example more complex than is necessary to explain the present invention.

In FIG. 8, the equations for M (as an object B) for space to pixel conversions are as follows.

$$x^s{}_B = 3 + x^p{}_B \quad (1)$$

$$y^s{}_B = 0 \quad (2)$$

$$z^s{}_B = -2 - y^p{}_B \quad (3)$$

Eq. 14

We will use the coordinates directly for positioning an object A (i.e. $T_A$), so we have:

$$x^s{}_A = x^s{}_B \quad (1)$$

$$y^s{}_A = y^s{}_B \quad (2)$$

$$z^s{}_A = z^s{}_B \quad (3)$$

Eq. 15

For $(x^p{}_B, y^p{}_B, z^p{}_B,)$, which are equal to $(x^s{}_A, y^s{}_A, z^s{}_A,)$ (via Equation 15), for the coordinates of $(1, 3, 0)$ on object B (object M) we get (via substitution into Equation 14) that:

$$x^s{}_B = 3 + x^p{}_B = 3 + 1 = 4 \quad (1)$$

$$y^s{}_B = 0 \quad (2)$$

$$z^s{}_B = -2 - y^p{}_B = -2 - 3 = -5 \quad (3)$$

Eq. 16

As before object A is a circle with a radius of 0.5 spatial units and may been seen positioned at $(4,0,-5)$ as illustrated in FIG. 8 at "A when positioned relative to M."

One of skill in the art will understand and appreciate that the techniques discussed above may be used for any orientation of any object, any grid orientation, and any placement. Additionally, the object and the grid need not be visible to a user.

In the previous examples of embodiments of the present invention we positioned an object. In this example we will position an object and also specify that the dimensions of the object being moved also change.

Figure 9:
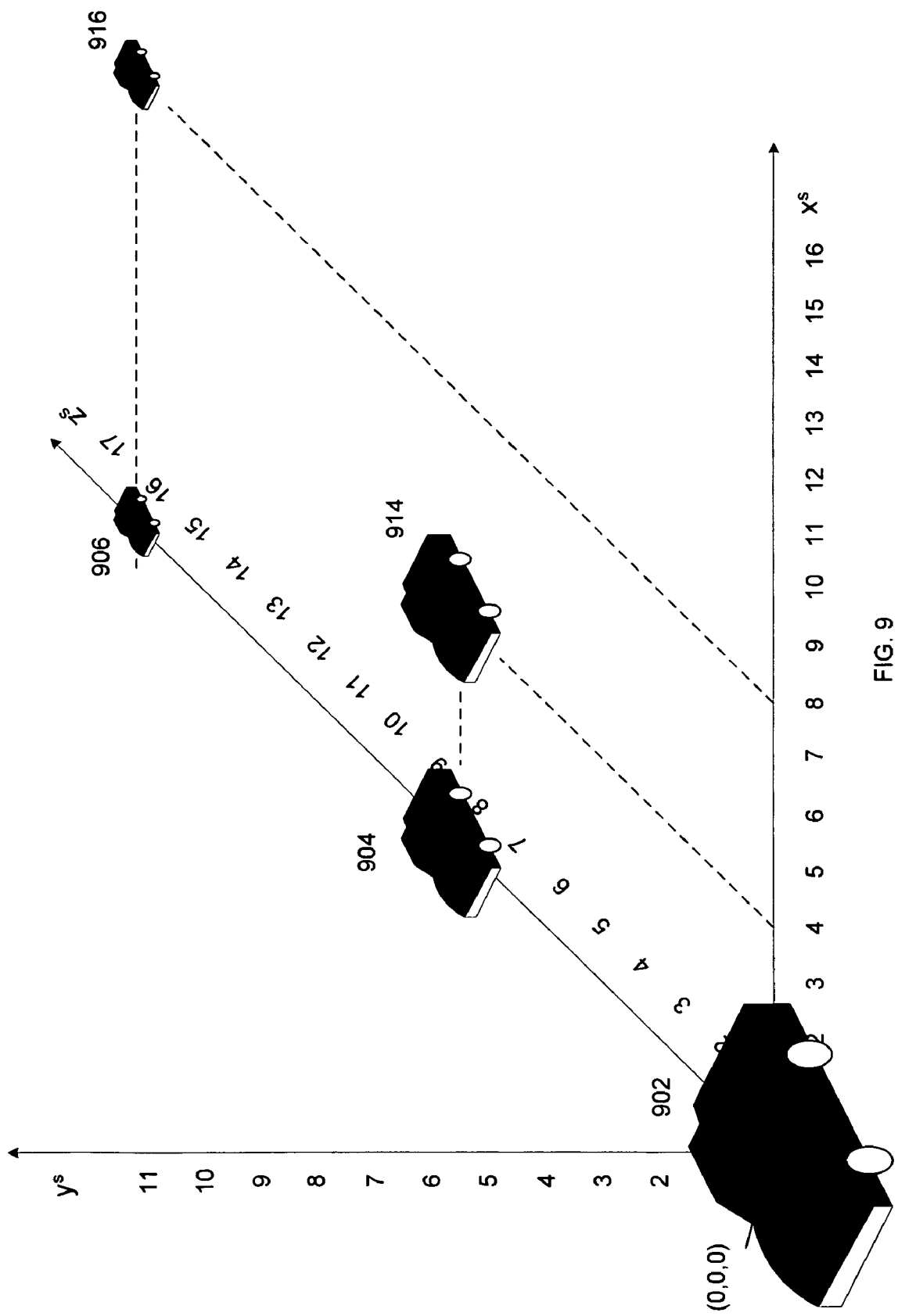

In FIG. 9 is one embodiment of the invention. Here for sake of illustration, the object pixel grid coincides with the spatial $x^s y^s$ plane and has the same pixel distance. This is for values of $z^s$. This is $x^s y^s$ plane at any $z^s$ is Object B. Object A is the car.

In the first example we will use the coordinates directly for positioning object A (i.e. $T_A$ equation), so we have:

$$x^s{}_A = x^s{}_B \quad (1)$$

$$y^s{}_A = y^s{}_B \quad (2)$$

$$z^s{}_A = z^s{}_B \quad (3)$$

Eq. 17

The equations for object B spatial to pixel are these in the first example:

$$x^s{}_B = x^p{}_B * (\tfrac{1}{2} \hat{} (z^p{}_B / 8)) \quad (1)$$

$$y^s{}_B = y^p{}_B (\tfrac{1}{2} \hat{} (z^p{}_B / 8)) \quad (2)$$

$$z^s{}_B = z^p{}_B \quad (3)$$

Eq. 18

Using these equations, the reader will note that the car is being scaled equally in both the x and y dimensions and exponentially in the z dimension. If the car is positioned at $(0,0,0)$ then the car is full size as shown at 902. If the car is positioned at $(0,0,8)$ that is it is "pushed" back in the z dimension further away from the $(0,0,0)$ coordinate, then the car is pointing in the same direction as at 902 however it is now ½ the size in both the x and y dimensions and is located at the $z^s=8$ as indicated at 904. If the car is positioned at $(0,0,16)$ then it is ¼ the size of 902 and is indicated at 906.

One of skill in the art will appreciate that this scaling may effectively communicate to the user a perceived "distance" of a object, for example, from the front of the screen.

Continuing with FIG. 9, using the same object B spatial to pixel equation (Eq. 18) and changing the positioning equation $T_A$ as follows:

$$x^s{}_A = x^s{}_B + z^p{}_B / 2 \quad (1)$$

$$y^s{}_A = y^s{}_B \quad (2)$$

$$z^s{}_A = z^s{}_B \quad (3)$$

Eq. 19

Now the object A will be moved in the x dimension based on its position in the z dimension. This is illustrated in FIG. 9 at 914 and 916. So when the car is positioned at pixel coordinates (0,0,8), it will be at spatial coordinates (4,0,8) and be ½ size. When object A (the car) is asked to position itself on object B (recall the $x^s y^s$ plane at any $z^s_B$) at pixel B coordinates of (0,0,16) then it will be ¼ size and positioned at spatial coordinates (8,0,16) as shown at 916.

One of skill in the art will appreciated that positioning equation $T_A$ may also have factors to adjust the y and z dimension as well. So for example, a car located at z=0 may be facing forward, one at z=8 may be rotated to the right say 45 degrees, and one located at z=16 by be at a 90 degree angle to that of a car at z=0. What is to be appreciated is that by changing several factors any type of motion (rotation, sizing, tilting, non-linear etc.) is possible. Additionally, while the examples above have used a "uniform" grid for the object B and object A, this is not a limitation of the present invention and one of skill in the art will understand that the techniques discussed may be applied to even non-uniform surfaces.

Figure 10:
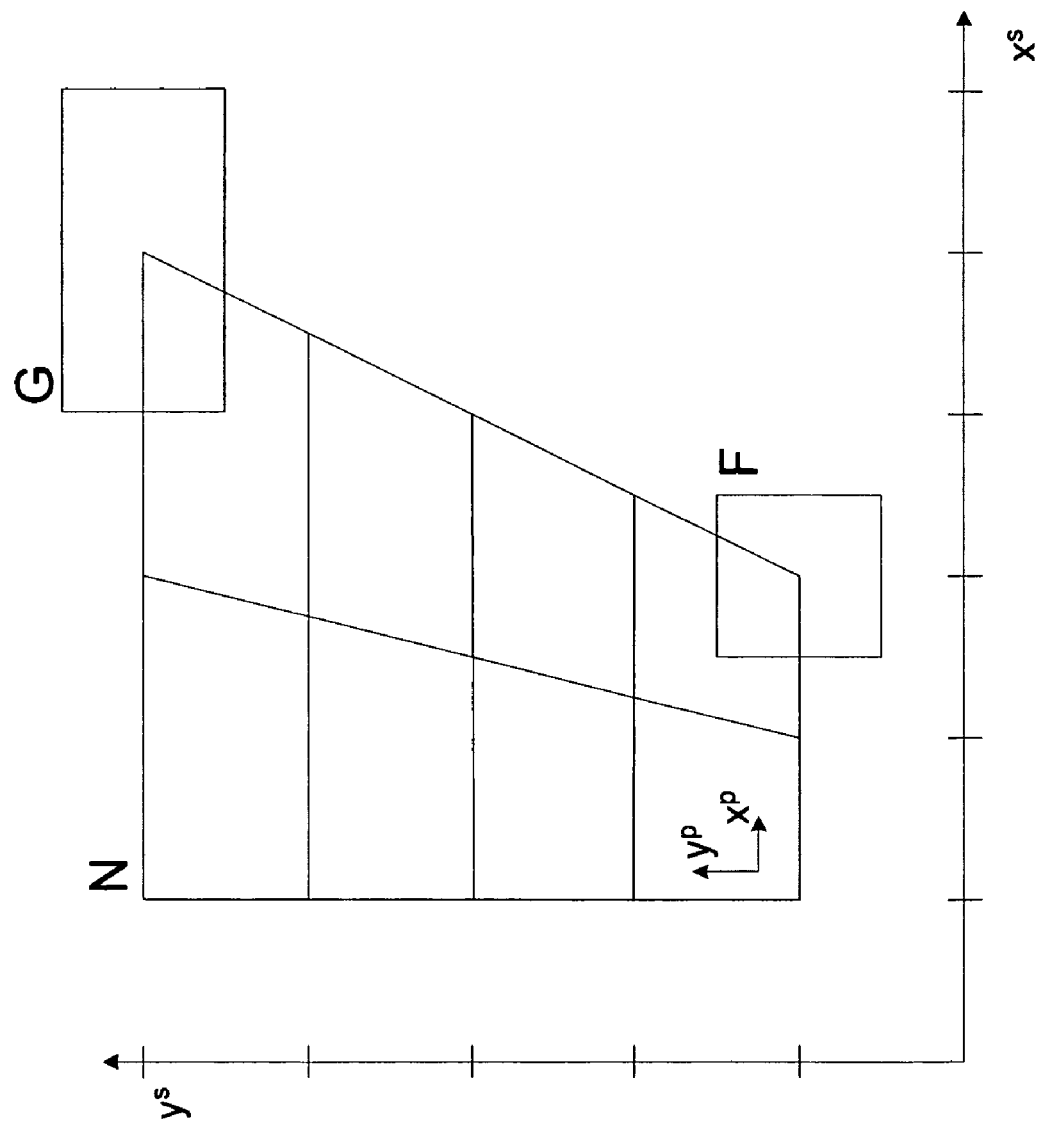
FIG. 10 illustrates one embodiment of the invention showing warping pixels.

In this example of an embodiment of the present invention, as illustrated in FIG. 10, we will position and scale by using a B object with sides of different lengths, thereby warping pixels so that they are no longer rectangular as measured in spatial distance. As $x^p$ and $y^p$ increase the $x^s$ spatial widths of the pixels will increase as well. The object docking (also called positioning) to it will be rectangular in shape but the height of the object is dependent on the width of a pixel.

The B object in this example will be called object N. Its positional equations will be as follows.

$$x^s_B = 1 + x^p_B * (1 + 0.25 * y^p_B) \quad (1)$$

$$y^s_B = 1 + y^p_B \quad (2)$$

$$z^s_B = z^p_B \quad (3)$$

Eq. 20

The pixel size on B is also relevant here. We will define the spatial width as $\Delta x^s$ and the spatial height as $\Delta y^s$. Note that in the pixel coordinate system $\Delta x^p$ and $\Delta y^p$ are both 1 unit.

$$\Delta x^s_B = 1 + 0.25 * y^p_B \quad (1)$$

$$\Delta y^s_B = 1 \quad (2)$$

Eq. 21

For this example we will be sizing the A object as well as positioning it. The equations for the size are as follows.

$$w^s_A = \Delta x^s_B \quad (1)$$

$$h^s_A = \Delta x^s_B \quad (2)$$

Eq. 22

Here, $w^s_A$ is the width of the A object, and $h^s_A$ is height of the A object.

We will size and position two A type of objects. The first is object F, and lies at the $(x^p_B, y^p_B, z^p_B)$ coordinates of (2, 0, 0). The width of the object will be given as $w^s_B$ and $h^s_B$. The equations for the position and size will be as follows.

$$x^s_B = 3 \quad (1)$$

$$y^s_B = 1 \quad (2)$$

$$z^s_B = 0 \quad (3)$$

$$w^s_A = 1 \quad (4)$$

$$h^s_A = 1 \quad (5)$$

Eq. 23

For the second object, G, we will use $(x^p_B, y^p_B, z^p_B)$ coordinates of (2, 4, 0) we get that $$x^s_B = 5 \quad (1)$$

$$y^s_B = 5 \quad (2)$$

$$z^s_B = 0 \quad (3)$$

$$w^s_B = 2 \quad (4)$$

$$h^s_B = 1 \quad (5)$$

Eq. 24

One of skill in the art will appreciate that the calculations associated with such techniques may be implemented in hardware, software, or a combination of these. Thus what has been disclosed is a method and apparatus for identifying pixel position and geometry in 3D systems.

What has been described above was limited for sake of explanation to relatively simple objects, for example, circles, rectangles, and 2D representations (i.e. the car). Additionally placement of the object (in examples above, object A) was limited to a single point in space. The invention is not so limited. A point in space may have associated with it other information, such as, but not limited to, a normal, a rotational component, etc. One of skill in the art will appreciate that this additional information may be used in positioning or "docking" one object to another.

Figure 11:
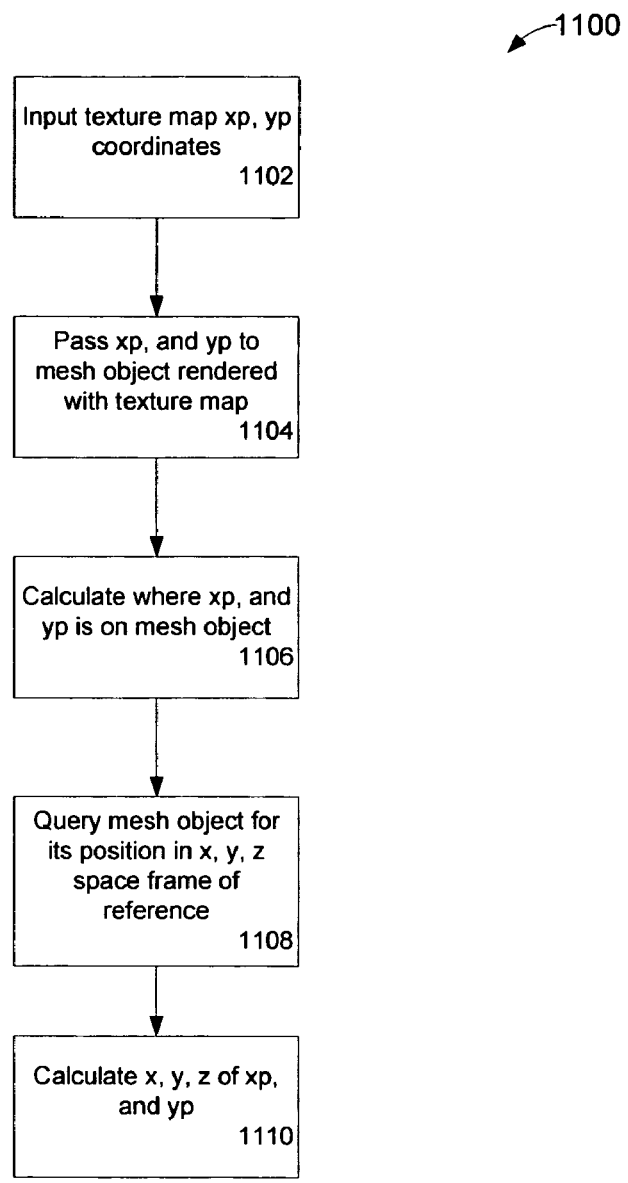
FIG. 11 illustrates one embodiment of the present invention for determining a pixel position.

Thus, for example, a curved road may have associated with it a rotational component. When another object, for example, a car is docked to the road at different locations, it may appear to be "rotated" so as to appear to be traveling safely in the middle of the lane it is in. An outer edge of the same road may have a different rotational component (and normal component) which may render a car careening over the edge or out of control FIG. 11 illustrates one embodiment of the present invention for determining a pixel position. Here a request has been made to determine the absolute x, y, and z position of a pixel within for example, a stated frame of reference. At 1102 xp, and yp, the coordinates of a pixel on a texture map are input. At 1104 xp, and yp are passed to the mesh object which was rendered with the texture map on which xp, and yp reside. At 1106 the pixel position of xp, and yp on the mesh object is calculated. At 1108 the mesh object is queried for its position in the above mentioned x,y,z frame of reference. At 1110 the x,y,z coordinates of xp, and yp are calculated based on the mesh's position within the x, y,z frame of reference and the xp, yp position of the texturemap pixel on the mesh.

If the bitmap is displayed on a 2D display then it will have, for example, x, and y coordinates. For an object displayed as a bitmap, it may have had a texture mapped to it. For example, a 3D cube may have had a stone-like surface texture map applied to it prior to display. This texture map may have been a 2D texture map. Finally, the cube may have positioned in a frame of reference at coordinates, x, y, and z. (N.B. One skilled in the art will understand that the coordinates of these three entities, while using similar names to denote the coordinates (x, y, and z) are not the same and represent three different sets of coordinate values.)

In one embodiment of the invention information related to the orientation and rotation of a pixel may be used. One vector may represent the normal to the pixel's surface at the coordinates, and another vector indicating how the pixel is rotated around the normal vector.

In one embodiment of the invention information related to the curvature of a pixel may be used. This may be used for single point uses, such as a pin in the surface of the globe, as well as covering a section of a surface with another set of polygons hovering over the surface, for example, always at a same height. For example, if one wanted to put a rectangular label on a globe over the center of the United States that said "USA" and which was raised above the surface and curved over the surface one could use local curvature information. Curvature is a measure of how much a cross-section of a surface resembles a circle. This may be measured along the x pixel direction and the y pixel direction, so the two measures give a good representation of the surface's curvature.

In one embodiment of the invention information related to the model view scaling may be used. This could affect the size of objects, in particular if the objects are rendered into a model view matrix that is not a child of the current model view matrix.

Thus a method and apparatus for identifying pixel position and geometry in 3D systems have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
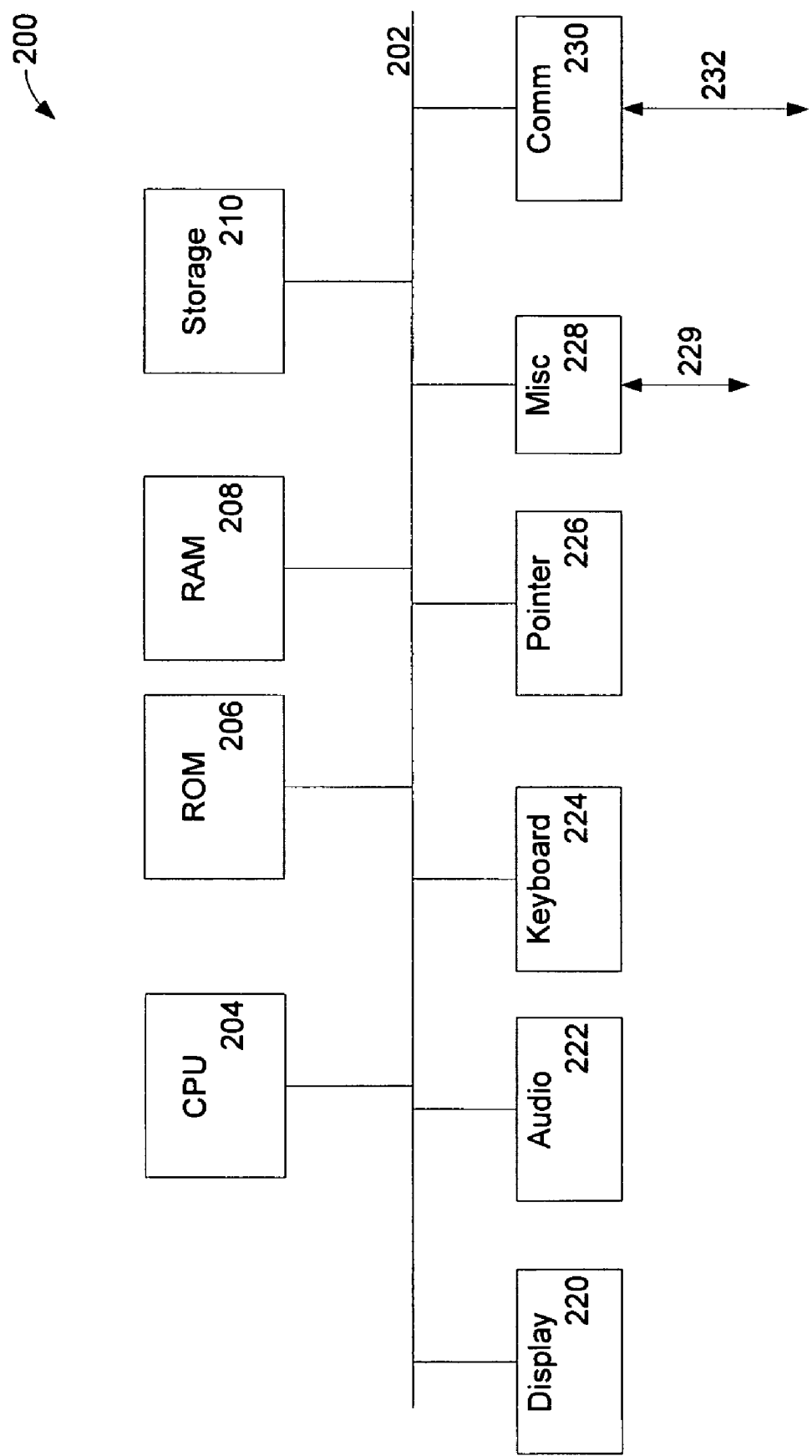
FIG. 2 is a block diagram of a computer system which may be used for implementing some embodiments of the invention.

FIG. 2 illustrates a computer system 200 in block diagram form, which may be representative of any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230.

The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), Simulated 3D Display Screen, Holographic Display System, etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description reference to a transform, transformation, transform matrix, frame of reference, frame, coordinate transformation, etc. is to be understood to refer to those aspects in the context in which it is used to refer to 3D systems, the position and/or placement of objects in a 3D space, etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for identifying pixel position and geometry in 3D systems have been described.

What is claimed is:

1. A method comprising:

receiving at object A translation information;

receiving at object A positional information about an object B, wherein said positional information is selected from a set consisting of an equation, a point in space, relative coordinates, texture map coordinates, vector, transformation matrix, table of numbers, and user input;

translating said object A using said received translation information, wherein said translation information is texture map translation information;

positioning said object A using said received positional information; and displaying to a user said Object A.

2. An apparatus comprising:

a first object having a first and second input and an output, said first input coupled to receive texture map pixel information from a controller about a second object;

said second object having an input and an output, said input coupled to receive said first object output, and said output coupled to send to said first object second input global coordinate information corresponding to said texture map pixel information; and a display for presenting to a user said global coordinate information.

3. A method comprising:

receiving at a first object equations from a third object;

receiving at said first object from said third object positional information relative to a second object;

querying said second object and receiving at said first object from said second object positional information relative to a fourth object;

determining a final position based on said equations, said positional information relative to said second object, and positional information relative to said fourth object; and positioning said first object at said final position; and displaying to a user said first object at said final position.

4. The method of claim 3 wherein said third object is a controller.

5. The method of claim 3 wherein said fourth object is a global frame of reference.

6. The method of claim 5 wherein said global frame of reference is a coordinate system selected from the group consisting of a Cartesian coordinate system, a polar system, an oblique coordinate system, and a projected coordinate system.

7. The method of claim 3 wherein said objects passes one or more properties selected from the group consisting of visibility, invisibility, texture map, normal vector, and rotational vector.

8. The method of claim 3 further comprising transforming said first object using said equations.

9. A method comprising:

receiving at a first object from a controller a pixel position on a second object, wherein said pixel position is a texture map pixel position, and wherein said second object is unbounded;

receiving from said controller at said first object translation parameters;

translating said first object based on said translation parameters;

sending to said second object from said first object a query containing said pixel position;

receiving at said first object from said second object a global position, wherein said global position is in a 2 or more dimensional coordinate system;

moving said first object to said global position; and displaying to a user said first object.

* * * * *